April 7, 1964   J. J. GERONDEAU   3,127,660
SOLID TANTALUM CAPACITOR
Filed Dec. 6, 1960
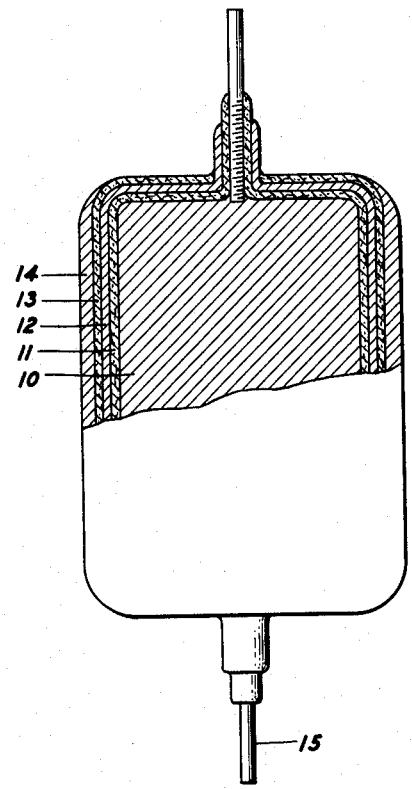
INVENTOR
P. J. GERONDEAU
BY
ATTORNEY United States Patent Office 3,127,660
Patented Apr. 7, 1964

3,127,660
SOLID TANTALUM CAPACITOR
Pierre J. Gerondeau, Andover, Mass., assignor to Bell Telephone Laboratories, Incorporated, New York, N.Y., a corporation of New York
Filed Dec. 6, 1960, Ser. No. 74,184
6 Claims. (Cl. 29—25.31)

This invention relates to a method for the fabrication of tantalum solid electrolytic capacitors utilizing a tantalum body as one of the electrodes, an oxide layer of the tantalum produced by anodization as the dielectric, and an electrically conductive counter electrode.

In one specific embodiment, this invention relates to an improved method for establishing electrical contact between the semiconductor electrolyte and the metallic cathode or counter electrode of tantalum solid electrolytic capacitors.

In the preparation of tantalum solid electrolytic capacitors it is necessary to provide a low electrical resistance contact between the manganese dioxide electrolyte and the counter electrode in order to prevent excessive resistance losses.

In brief, a typical procedure for fabricating tantalum electrolytic capacitors comprises boiling a wound wire, foil or porous body of tantalum in a hydrocarbon solvent to remove oil or grease which may be present upon its surface. The tantalum body is next treated with a conventional cleaning solution, such as a mixture of chromic and sulfuric acids, in order to remove carbonaceous impurities. Following the above cleaning step the body is anodized in the customary manner. For example, an electrolyte which is suitable for this purpose is an aqueous solution containing 3% by weight of boric acid and ½% by weight sodium borate tetrahydrate.

The anodized body is then coated with a layer of a semiconductive material which is deposited by thermal decomposition of manganous nitrate. The oxide coated tantalum electrode is dipped into an aqueous solution of manganous nitrate and when heated the nitrate decomposes leaving a coating of manganese dioxide. This process is repeated until the required thickness of manganese dioxide is produced. Following this, carbon is deposited upon the manganese dioxide layer to provide the necessary electrical contact between the semiconductive layer of manganese dioxide and the metallic counter electrode which is next deposited upon and in intimate contact with the carbon layer.

In accordance with this invention, there are produced from mechanically-worked bodies electrolytic capacitors utilizing tantalum anodes which evidence low electrical resistance contact between the manganese dioxide semiconductive layer and the counter electrode. A novel method for depositing the manganese dioxide semiconductive layer upon the oxide coated tantalum body is described wherein manganese dioxide and dry powdered carbon are simultaneously deposited on the anodized tantalum.

The novel technique disclosed herein is economically attractive since it eliminates a processing step in the manufacture of the capacitors, namely, the independent deposition of carbon upon the manganese dioxide semiconductive layer subsequent to its deposition upon the anodized tantalum body.

This invention will be more fully understood from the following detailed descriptions when taken in conjunction with the accompanying drawing wherein:

The figure is a front elevation view, partly in section, of a solid tantalum electrolytic capacitor made in accordance with this invention.

With further reference to FIG. 1, there is depicted a solid electrolytic capacitor of the type to which the present invention is directed. Anode 10 is a porous tantalum body obtained from a sintered bar made by powder metallurgical methods. In intimate contact with the entire surface of anode 10 is oxide film 11 produced by anodization. Covering oxide film 11 is a coating of manganese dioxide 12 produced by pyrolysis of an aqueous solution of manganous nitrate. Carbon-rich layer 13 and solder shell 14 complete the capacitor. Electrode 15 is attached to shell 14 by schooping.

The above electrode and capacitor structure is given merely as an illustration and any suitable construction may be used.

For illustration purposes, the present invention is described below in terms of the fabrication of solid electrolytic capacitors using a tantalum pellet as the anode. However, it is to be appreciated that the present invention is applicable to the manufacture of porous and dense tantalum anodes regardless of the capacitor configuration.

One illustration of the process of the invention is in the fabrication of a solid electrolytic capacitor employing a high purity tantalum pellet of capacitor grade (99.99% purity) equipped with a tantalum lead as the anode.

The tantalum pellet is anodized in an electrolytic cell in which the pellet is made the anode and a tantalum sheet is used as the cathode. The electrolyte employed is an aqueous solution of 0.4% nitric acid. An anodizing voltage of the order of 60 to 125 volts D.-C. is applied initially and maintained for approximately three to four hours. It has been found that anodizing for less than three hours produces an oxide film which is not of uniform thickness and may be porous. Application of anodizing voltages for more than five hours changes the structure of the oxide film from amorphous to crystalline form which is possessed of poor dielectric properties. The thickness of the tantalum pentoxide film is directly proportional to the voltage applied during the anodizing step and it has been found that the preferred thickness is of the order of 1000 to 3000 Angstroms.

The anodized body is then dried in air at a temperature of 120 to 125° C. for a time period within the range of ten to twenty minutes. Following the drying step the anode is immersed into an aqueous solution containing 50 to 60% by weight of manganous nitrate. The use of concentrations greater than 60% are impractical since the nitrate crystallizes, whereas the use of concentrations less than 50% fail to produce a coating of sufficient thickness. Next the anode is heated with an induction heater at a temperature within the range of 300 to 350° C. for a time period within the range of five to seven minutes.

Following the pyrolysis, the coated anode may be reanodized in a manner similar to the initial anodization in an electrolyte which may consist of an aqueous solution of acetic acid. A reanodizing voltage approximately equal to the anodizing voltage is applied and maintained for twenty to thirty minutes.

The pyrolysis and reanodizing procedure may be repeated as often as eight times in succession to obtain a total of up to nine coats of manganese dioxide depending upon the size of the pellets, large pellets requiring a greater number of manganese dioxide layers to result in a uniform layer of semiconductive material. In accordance with this invention, the last layer or layers are formed from a suspension of powdered carbon in an aqueous solution of manganous nitrate. This solution is formed by adding one to five grams of dry powdered carbon to 100 cubic centimeters of the aqueous solution of manganous nitrate and the mixture is stirred thoroughly. The anode is then immersed into this solution and treated as noted above. Following this coating procedure the pellet is again reanodized and dried at a temperature in the range of 110 to 120° C. for ninety minutes.

The final step in the fabrication of the capacitor consists in depositing a soft solder casing over the carbon-manganese dioxide layer by schooping.

It is to be understood that the procedure outlined above is given for illustration purposes only and not for purposes of limitation. A number of variations may be made, for example, the electrolyte employed in the anodizing and reanodizing may be any of the anodizing electrolytes well known to those skilled in the art.

The effect of the novel procedure of this invention is reflected in the data shown in the table set forth below. Examples 1 through 3 represent capacitors fabricated in accordance with conventional prior art techniques.

EXAMPLES 1–3

Three 2-gram tantalum pellets of capacitor grade (99.99% purity) were anodized at 65° C. for three hours using a voltage of 110 volts D.-C. The electrolyte employed was a 0.4% nitric acid solution. The anodized bodies were then dried at a temperature of 120° C. for twenty minutes. Next, the dried pellets were coated with a layer of manganese dioxide formed in situ by a pyrolysis step. The anodes were immersed into an aqueous solution containing in excess of 50% by weight of manganous nitrate and heated by induction heating at a temperature of 300° C. The pyrolysis procedure was repeated four times to produce four coats of manganese dioxide. Following the pyrolysis, the pellets were reanodized at a voltage of 100 volts D.-C. for twenty-five minutes in an 81% acetic acid electrolyte. Next, the coated pellets were given an additional four coats of manganese dioxide and reanodized in the same manner as discussed above. Following this, the pellets were dipped into a solution containing one part carbon and two parts water and then reanodized in acetic acid for twenty-five minutes at a voltage of 100 volts D.-C. at room temperature. The coated pellets were then dried at 120° C. for ninety minutes. The capacitors were completed by schooping a soft solder casing over the pellets and soldering a lead to the casing.

Examples 4–8 represent capacitors fabricated in accordance with the present invention.

EXAMPLES 4–8

The procedure of Examples 1–3 was repeated using five tantalum pellets of capacitor grade with the exception that during the application of the last three manganese dioxide layers two grams of dry powdered carbon were added to 100 cubic centimeters of the manganous nitrate solution and mixed thoroughly prior to immersion of the pellets.

The table illustrates the effect of the above-described simultaneous deposition step on the electrical characteristics of solid tantalum capacitors and by comparing Examples 1 through 3 with 4 through 8 the beneficial effects of the novel process on electrical properties can be seen.

Table

| Example | Capacitance (microfarads) | Effective Series Resistance (ohms) | Leakage at 35 volts D.-C. (microamps) | Leakage at 65 volts D.-C. (microamps) |
| --- | --- | --- | --- | --- |
| 1 | 2.15 | 2.8 | 0.34 | 2.7 |
| 2 | 2.12 | 3.3 | 0.13 | 0.81 |
| 3 | 2.13 | 4.1 | 0.10 | 1.6 |

MANGANESE DIOXIDE AND CARBON DEPOSITED SIMULTANEOUSLY

| | | | | |
| --- | --- | --- | --- | --- |
| 4 | 2.17 | 1.9 | 0.07 | 0.65 |
| 5 | 2.06 | 2.2 | 0.03 | 0.23 |
| 6 | 2.14 | 1.9 | 0.06 | 0.60 |
| 7 | 2.04 | 2.0 | 0.05 | 0.45 |
| 8 | 2.13 | 1.85 | 0.06 | 0.53 |

As indicated by the table, the above-described simultaneous deposition procedure has a beneficial effect on effective series resistance and leakage current.

While the invention has been described in detail in the foregoing description and drawing, the aforesaid is by way of illustration only and is not restrictive in character. The modifications which will readily suggest themselves to persons skilled in the art are all considered within the broad scope of this invention, reference being had to the appended claims.

What is claimed is:

1. In the method of fabricating a tantalum solid electrolytic capacitor comprising the steps of anodizing a tantalum body, coating said tantalum body with a first semiconductive layer, reanodizing the said tantalum body, recoating the said tantalum body with a final semiconductive layer and depositing a counter electrode upon and in intimate contact with the said final semiconductive layer, the improvement which comprises simultaneously depositing the said final semiconductive layer and dry powdered carbon from a suspension of powdered carbon in an aqueous solution of manganous nitrate.

2. The method in accordance with claim 1 in which said tantalum body is a porous tantalum pellet.

3. The method in accordance with claim 1 wherein the said suspension consists essentially of one to five grams of dry powdered carbon in 100 cubic centimeters of aqueous manganous nitrate.

4. The method in accordance with claim 3 in which subsequent to the application of the final semiconductive layer the said tantalum body is reanodized and dried at a temperature in the range of 110 to 120° C. for ninety minutes.

5. The method in accordance with claim 1 wherein there are four semiconductive layers and the last three are applied from a suspension of powdered carbon in an aqueous solution of manganous nitrate.

6. The method in accordance with claim 1 wherein the said aqueous solution contains 50 to 60% by weight manganous nitrate.

References Cited in the file of this patent

UNITED STATES PATENTS[1]

2,936,514    Millard              May 17, 1960